Figure 1:
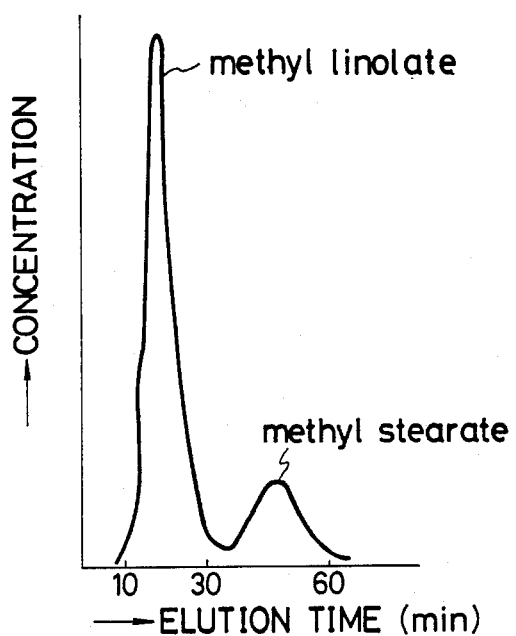

United States Patent [19]

Wagu et al.

[11] Patent Number: 4,497,710

[45] Date of Patent: Feb. 5, 1985

[54] SUBSTRATE FOR LIQUID CHROMATOGRAPHY AND PROCESS FOR ISOLATING AND PURIFYING FAT-SOLUBLE SUBSTANCE BY THE LIQUID CHROMATOGRAPHY ON THE SUBSTRATE

[75] Inventors: Masakatsu Wagu; Shoichiro Hayashi; Naohiro Murayama; Teruo Sakagami, all of Iwaki, Japan

[73] Assignee: Kureha Kagaku Kogyo Kabushiki Kaisha, Tokyo, Japan

[21] Appl. No.: 428,655

[22] Filed: Sep. 30, 1982

[30] Foreign Application Priority Data

Oct. 7, 1981 [JP] Japan ................................ 56-159713

[51] Int. Cl.$^3$ ............................................ B01A 15/08
[52] U.S. Cl. .................................... 210/635; 210/502.1
[58] Field of Search ...................... 210/635, 656, 198.2, 210/502.1; 521/52; 55/386

[56] References Cited

U.S. PATENT DOCUMENTS

| | | |
|---|---|---|
| 3,046,260 | 7/1962 | Stewart et al. |
| 3,586,626 | 6/1971 | Heitz ..................... 210/635 |
| 3,657,117 | 4/1972 | Pfitzneh et al. ..................... 210/635 |
| 4,046,720 | 9/1977 | Rembaum et al. ................... 210/635 |
| 4,128,706 | 12/1978 | Seita et al. ........................... 210/635 |
| 4,314,032 | 2/1982 | Muhayama et al. ............. 210/656 X |
| 4,338,404 | 7/1982 | Tanaka et al. ....................... 210/635 |

FOREIGN PATENT DOCUMENTS

| | | |
|---|---|---|
| 43074 | 1/1982 | European Pat. Off. |
| 2632648 | 1/1978 | Fed. Rep. of Germany |
| 924418 | 4/1963 | United Kingdom |
| 1528829 | 10/1978 | United Kingdom |

OTHER PUBLICATIONS

Chromatographic and Allied Methods by Mikes, John Wiley & Sons of New York, pp. 212–214, 1979.
Bulletin of the Japanese Society of Scientific Fisheries "Preparation of Eicosapentaenoic and Docosahexaenoic Acids by Reversed Phase High Performance Liquid Chromatography", 47(5), 675, 1981.
Bulletin of the Jap. Society of Scientific Fisheries, "Separation of Polyunsaturated Fatty Acids by Column Chromatography on a Silver Nitrate–Impregnated Silica Gel", 44(8), 927, 1978.
Patent Abstracts of Japan, vol. 5, No., 62, Apr. 25, 1981, "Gel for Filtration".

*Primary Examiner*—John Adee
*Attorney, Agent, or Firm*—Oblon, Fisher, Spivak, McClelland & Maier

[57] ABSTRACT

A substrate for liquid chromatography comprising a spherical particle of highly cross-linked polymer which is produced from (a) 100 parts by weight of a monomer of vinyl ester, acrylate or methacrylate, these esters having a long alkyl chain, if desired, together with a comonomer copolymerizable with the monomer and (b) 10 to 80 parts by weight of a cross-linking agent copolymerizable with the monomer and having at least two functional groups, and a process for isolating and purifying a fat-soluble substance, for instance, a lower alkyl ester of eicosapentaenoic acid or docosahexaenoic acid by means of the liquid chromatography on the substrate.

6 Claims, 8 Drawing Figures

SUBSTRATE FOR LIQUID CHROMATOGRAPHY AND PROCESS FOR ISOLATING AND PURIFYING FAT-SOLUBLE SUBSTANCE BY THE LIQUID CHROMATOGRAPHY ON THE SUBSTRATE

This invention relates to a substrate of a cross-linked polymer for liquid chromatography and a process for isolating and purifying a fat-soluble substance by means of the liquid chromatography in which the cross-linked polymer is used as the substrate. Particularly, the invention relates to a hard and spherical polymer particle prepared by highly cross-linking a polymer of vinyl ester, acrylate or methacrylate, these esters having a long alkyl side chain, and to a process for isolating and purifying a fat-soluble substance, for instance, a lower alkyl ester of eicosapentaenoic acid or docosahexaenoic acid by the liquid chromatography in which a substrate is the polymer particle.

Chromatography is one of the most fundamental methods for isolation, purification and analysis in chemistry and is frequently applied to many and various substances therefore. Of the various kinds of chromatography, liquid chromatography is an excellent method for isolating and analyzing the specimen at normal temperature, and is properly applicable to a substance which should be treated under mild conditions to retain the properties thereof, such as naturally occuring substances and biotic substances.

The liquid chromatography is broadly subdivided according to the modes of isolation into ion-exchange, permeation, absorbing and partition chromatography. The process for isolation and purification according to the present invention belongs to an inversed phase partition chromatography. The partition chromatography is based on the difference between the solubility of a specimen to be isolated in the stationary phase and in the moving phase, and one kind of the multiple stage extraction methods.

There have been known two types of substrates for isolating and purifying the fat-soluble substance by the liquid partition chromatography, hitherto. One of them is a silica gel coated with a compound having alkyl group(s), and the other is also coated, however, by chemically bonding lipophilic groups such as alkyl groups to a reactive silanol groups on the surface of silica gel. These two types of the substrates have their stationary phase on the surface of the carrier silica gel.

However, the substrates mentioned above are suitable for the isolation of the specimen to be purified on a laboratory scale, but not to isolation on an industrially large scale, since their stationary phase is limited to the surface of the carrier and accordingly their capacity of loading the specimen is too small to be applied for industrially isolating or purifying a large amount of the specimen. Further, in the type of substrate in which the lipophilic groups such as alkyl groups are bonded to the silanol groups of the carrier, some silanol groups do not occasionally react with the lipophilic groups and the unreacted silanol groups adsorb the specimen to be purified. Problems also arise when using a moving phase with high polarity. In such a case, there is a defect that the moving phase with high polarity, for instance, water, alcohol and the like hydrolyzes the bonding of silanol to the alkyl group, Si—O—R wherein R represents the alkyl group.

As another substrate for isolating and purifying the fat-soluble substances other than the two types mentioned above, there are also known porous polymers of polystyrene, polyvinyl acetate, polymethyl methacrylate, etc. However, as will be seen in Comparative examples hereinafter, these substrates are not satisfactory for the isolation and purification of the long chain aliphatic compounds because of their lack of the long carbon side chain. In addition, as the porous polymers have a large influence on the separation of the specimen to be purified by the same reason, the preliminary inspection of their specific separation properties should be necessitated for every specimen to be purified while paying attention to the eluent used therewith. Furthermore, in this case, there is another defect that the porous polymers are apt to be swelled by the solvent of elution and then the applicable eluent are strongly limited.

Therefore, there has not yet been found a satisfactory substrate for liquid chromatography, which has such a great ability to isolate with high purity and in an industrially large amount highly fat-soluble and unstable substances, especially, highly unsaturated long chain aliphatic acids, for instance, lower alkyl ester of eicosapentaenoic acid, EPA, and docosahexaenoic acid, DHA. The lower alkyl esters of EPA and DHA, which are known to have prophylactic and therapeutic activities against cerebral thrombosis and myocardial infarction, are highly fat-soluble and in addition are unstable since they are apt to be affected by heat, light, oxygen, etc. due to the five to six carbon—carbon double bonds of cis type in their chemical structure.

The object of the present invention is to provide a satisfactory substrate for liquid chromatography, which has a high ability to isolate and purify fat-soluble and unstable substances industrially in a large amount. Another object of the invention is to provide a process for isolating and purifying the fat-soluble and unstable substance, especially lower alkyl esters of EPA and DHA. The other objects of the invention will be apparent from the subsequent descriptions of the specification.

The substrate of the present invention for the liquid chromatography, comprising a spherical particle of highly cross-linked polymer which is produced from:

(a) 100 parts by weight of a monomer unit selected from the group consisting of a monomer represented by the general formula (I) or (II) and a mixture of the monomer with a comonomer copolymerizable with the monomer;

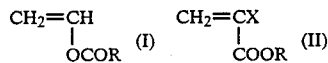

wherein R is an alkyl group of at least 6 carbon atoms and X is a hydrogen atom or a methyl group, (b) 10 to 80 parts by weight of a cross-linking agent copolymerizable with the monomer and having at least two functional groups.

The process for isolating and purifying the fat-soluble and unstable substances according to the present invention is characterized by the employment of the substrate mentioned above for the liquid column chromatography.

As the spherical particles of the substrate have basically the vinyl polymer with the long carbon side chain, it is possible to elute the adsorbed substances from the column one after another in the order of their polarity (solubility to fat) without any influences from the vinyl polymer, and it is particularly possible to isolate and purify the highly fat-soluble and highly unsaturated long chain aliphatic acids and their derivatives. For example, as shown in Examples hereinafter, it is now possible to purify the lower ester of eicosapentaenoic acid such as methyl eicosapentaenoate to a relatively high purity. This was considered so far to be difficult to purify highly. Moreover, as the spherical particles of the substrate according to the invention are highly cross-linked, various organic solvents are applicable as the eluent. Furthermore, as the long side chain is bonded to the vinyl polymer through an ester bond, the substrate of the invention is very stable to almost all solvent other than the strong alkaline solvent.

The substrate of the invention which comprises a highly cross-linked vinyl polymer with the long alkyl side chain is also provided with a large capacity of loading the specimen to be purified as seen in the porous polymers. The substrate is extremely useful in an inverse phase partition chromatography in the industrial scale.

The present invention will be described in detail hereinafter.

The substrate of the invention comprises spherical gel particles of highly cross-linked structure obtained by copolymerization of (a) 100 parts by weight of a monomeric unit containing 10 to 100% by weight of the monomer represented by the general formula (I) or (II) and 90 to 0% by weight of the comonomer copolymerizable with the monomer and (b) 10 to 80 parts by weight of the cross-linking agent copolymerizable with the monomer and having at least two functional groups. The substrate is ordinary produced by the suspension copolymerization.

In the vinyl ester represented by the general formula (I) and the acrylate or methacrylate represented by the general formula (II), more is the number of carbon in the alkyl group, R, lower is the mutual interaction between the moiety of ester-bonding and the specimen and higher is the lipotropism of the substrate. Accordingly, the number of the carbon atoms in the alkyl group of the formula (I) or (II) is at least 6 and less than about 30. The number of the carbon atoms in the alkyl group may be selected in this range according to the specific properties of the specimen to be isolated and purified and to those of the eluent.

The vinyl ester, acrylate and methacrylate may be polymerized to monopolymer, respectively, or to copolymer together therewith. As an instance of these esters, vinyl octanoate, vinyl laurate, vinyl stearate, 2-ethylhexyl ester, dodecyl ester and stearyl ester of acrylic acid and methacrylic acid can be mentioned. Particularly, in the case of purification of the fat-soluble substance with long carbon chain such as lower alkyl ester of EPA or DHA to the high extent, those alkyl esters having the long alkyl chain are preferable and the monomer selected from the group of vinyl stearate and stearyl methacrylate is most preferable.

The copolymer copolymerizable with the vinyl ester, acrylate or methacrylate may be selected without any specific restriction, however, other than a highly hydrophilic monomer. As the comonomer, vinyl esters, acrylate and methacrylate of not more than 5 carbon atoms in their alkyl groups and other vinyl compounds such as styrene, methylstyrene, acrylonitrile, vinyl chloride, vinylidene chloride, isobutylene, etc., and diene compounds such as butadiene, isoprene, chloroprene, etc.

The amount of the vinyl ester, acrylate or methacrylate to be polymerized according to the invention is 10 to 100% by weight. Below 10% by weight, as the lipotropism of the produced polymer is insufficient, the obtained polymer has less ability to isolate and purify the long chain aliphatic acid ester and the isolation of the fat-soluble specimen does not proceed well.

The monomer unit may be solely occupied either by the vinyl ester, acrylate or methacrylate represented by the formula (I) or (II). However, in this case, as the eluent of high polarity is possibly slow the elution of the adsorbed fat-soluble substance, the eluent should be selected appropriately.

The cross-linking agent of the invention may be any one as far as it is copolymerizable with the monomer mentioned above and has at least two functional groups. For instance, those multifunctional and unsaturated compounds, for instance, those polyalkenyl-substituted aromatic compounds such as divinylbenzene, trivinylbenzene, etc., those polyesters of polyvalent alcohol with unsaturated carboxylic acids such as mono- and polyethyleneglycol dimethacrylate, polypropyleneglycol dimethacrylate, trimethylolpropane trimethacrylate, etc., those polycarboxylic acid esters of unsaturated alcohol such as divinyl adipate, diallyl phthalate, etc. those ethers of two unsaturated alcohols such as divinyl ether, vinyl allyl ether, etc. and those esters of unsaturated acid with unsaturated alcohol such as vinyl acrylate, etc. can be mentioned.

Particularly, the cross-linking agent represented by the following general formula (III) and (IV) is most preferable among others:

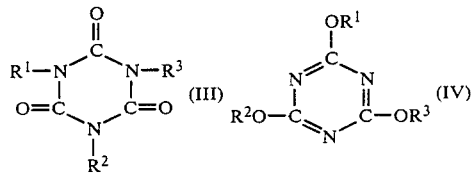

wherein $R^1$, $R^2$ and $R^3$ are the same or different from each other and represent an allyl group, a 2-propynyl group or a 2-methyl-2-propenyl group. The cross-linking agent represented by the formula (III) or (IV), which is trifunctional and has a triazine ring-structure, exhibits not only a favorable cross-linking ability but also a large lipotropism.

The amount of the cross-linking agent to produce the cross-linked polymer is very important because the swelling property of the obtained cross-linked polymer, caused by the eluent, is largely dependent on the extent of the cross-linking degree. In order not to show a large change of the substrate of the present invention due to the kinds of the eluent, the amount of the cross-linking agent is 10 to 80 parts by weight to 100 parts by weight of the amount of the monomer unit, preferably 15 to 60 parts by weight. Below 10 parts by weight, the substrate has a poor cross-linking degree. On the other hand, above 80 parts by weight, the substrate is fragile, and additionally it is difficult to obtain the substrate of a large loading capacity of the specimen and the occupied amount of long chain alkyl groups in the substrate polymer is relatively reduced.

According to the present invention, in the process for producing the cross-linked polymer which is used as the substrate for liquid chromatography, it is preferable to add an organic solvent in the step of polymerization.

By the addition of the organic solvent, the obtained cross-linked polymer becomes porous and has the enlarged capacity of loading the specimen. The addition of the solvent is thus particularly favorable for the isolation and purification of the specimen in an industrial scale. The solvent added should not be polymerizable and should not inhibit the polymerization reaction. The solvent which is compatible with the polymer of the substrate makes the pores of the substrate relatively small, and the solvent which is not compatible with the polymer of the substrate makes the pores of the substrate relatively large due to the phase separation during the polymerization. In general, the more porous and the larger size of the pores give the substrate the larger capacity of loading the specimen. It is possible to control the porosity and the size of the pore by changing the amount and the kinds of the solvent to be added according to the purpose what substance should be isolated. In general, the organic solvent is used in an amount of 30 to 300 parts by weight, preferably, 30 to 250 parts by weight per 100 parts by weight of the monomer unit.

Above more than 300 parts by weight of the addition of the solvent, there is an occasion of reducing the polymerizability of the monomer unit and the obtained cross-linked polymer has an insufficient strength to be used in high speed isolation.

The process for obtaining the substrate according to the present invention is preferably the usual radical polymerization in an aqueous suspension, thereby obtaining spherical particles of the cross-linked polymer. As the suspension agent, for instance, the water-soluble high polymer such as polyvinyl alcohol, methylcellulose, polyethylene oxide, polyvinylpyrolidone, etc. and powdery or glanular hydroxyapatite, calcium carbonate, bentonite and talc can be mentioned. Various kinds of surfactants may be used together with the suspending agent for the control of the diameter of the spherical polymer particles of the substrate. The preferable diameter of the polymer particle according to the invention is 3 to 500 microns.

As the initiator of the radical polymerization, an oil-soluble initiator is used, for instance, an organic peroxide such as diacyl peroxide, for example, lauroyl peroxide, benzoyl peroxide, acetyl peroxide, etc., an alkyl peroxide, for example, di-t-butyl peroxide, dicumyl peroxide, etc., a peroxyester, for example, t-tubyl peroxybenzoate, t-butyl peroxyacetate, butyl peroxyoctanoate, etc. and an azocompound such as azobisisobutyronitrile, azobisisovaleronitrile.

The spherical particles of cross-linked polymer obtained by the above-mentioned radical polymerization are washed well with water, hydrochloric acid or an organic solvent such as methanol, acetone, etc. and then dried. The thus obtained cross-linked polymer is used as the substrate for the liquid chromatography.

As the fat-soluble substances to be isolated and purified according to the present invention, water-insoluble substances with a relatively large fat-solubility, for instance, saturated or unsaturated aliphatic hydrocarbons having a relatively long carbon chain, saturated or unsaturated aliphatic esters and alcohols, glycerides having saturated or unsaturated alkyl group(s), fat-soluble vitamins such as vitamins A, D, E, etc., various steroids and their derivatives, and aromatic-, polycyclic aromatic- and heterocyclic aromatic compounds and their derivatives can be exemplified.

As has been described, the process for the isolation and purification according to the present invention is applicable to the fat-soluble substances in a broad range, and particularly suitable for isolation and purification of the substances with a large fat-solubility such as alkyl esters of EPA and DHA. The substance to be treated by the process according to the present invention may contain either of the esters of EPA or the esters of DHA or both together therein. The alkyl esters of EPA and DHA are usually contained in a fish oil and cod-liver oil, and their content therein usually amounts around 10% by weight. Though the fish oil and cod-liver oil per se may be processed by the isolating and purifying process of the invention to isolate the alkyl esters, it is preferable to preliminary purify the oil so as to contain the alkyl ester of EPA and/or DHA in the order of 60 to 80% by weight in order to improve the efficiency of purification by the chromatography according to the invention. As the means of the preliminary purification, a process of fractionation by using urea and a process of distillation under a high vacuum have been known, which are easily carried out in an industrial scale.

The column for use in the process according to the present invention is not restricted as far as they are used in an ordinary liquid chromatography, and those made of glass, steinless steel and various plastic materials are frequently used in a shape of a cylinder.

In executing the process for purification according to the present invention, generally the substrate is dispersed in a solvent which has the same composition as the eluent or has a little larger polarity than that of the eluent (namely, the solvent in which the substrate less swells than in the eluent), and then the thus formed dispersion is poured into the column or pressed into the column by a pump, etc. after debubbling the dispersion by stirring. The filling of the substrate is favorably effected by substituting the solvent in the column with the eluent. Since the substrate according to the present invention is mechanically strong, its separating capability is not affected by pressing into the column with a pump. After thus filling the column with the substrate, a solution of the fat-soluble substance to be purified is poured into the filled column, and after making the substance partitionally adsorbed on the substrate in the column, the eluent is pressed into the column by a pump to carry out the isolation and purification.

As the eluent, a solvent with suitable polarity is used. The eluent may be selected according to the kinds and amount of the impurities and the fat-soluble substance, the purity, the velocity of elution of the purified product and the necessary amount of the eluent. For instance, in the case of isolation of methyl linolate and methyl stearate from their mixture, a mixture of acetonitrile, dichloromethane and tetrahydrofuran is used, and in the case of a mixture of benzene and p-xylene, a mixture of acetonitrile and water is used. For the isolation and purification of an ester of an unsaturated fatty acid of a long carbon chain such as EPA and DHA, a mixture of 10 to 25% by volume of water, 50 to 70% by volume of a lower alcohol of 1 to 3 carbon atoms, preferably methanol and 10 to 40% by volume of a solvent selected from the group consisting of dioxane, ethyl ether and tetrahydrofuran is used as the eluent.

In the case of purification of an ester of an unsaturated fatty acid of a long carbon chain, the larger content of water in the eluent makes the velocity of elution slower and the necessary amount of the eluent larger, and on the other hand, the larger content of ether, dioxane and tetrahydrofuran in the eluent does not tend to raise the purity of the product although it makes the velocity of elution larger. Accordingly, as has been stated, it is necessary to select the suitable ratio of mixing the solvent components in every purification.

The eluate from the chromatographic column is subjected to a differential refractometer, an ultraviolet monitor, etc. to detect the substance therein, and then fractioned.

The present invention will be concretely explained while referring to Examples as follows:

The figures of the drawings illustrate the examples.

EXAMPLE 1

Preparation of a substrate according to the present invention

A monomer of 60 g of vinyl stearate, 12 g of triallyl cyanurate as a cross-linking agent and a mixed solvent of 20 g of n-octane and 40 g of ethyl acetate was subjected to polymerization in a state of suspension in water while using polyethylene oxide as a suspending agent and lauroyl peroxide as an initiator at 60° C. under agitation after substituting the aerial space of the reactor with gaseous nitrogen. After carrying out the polymerization for 16 hours, the reaction product was washed with methanol and then acetone to remove the solvents in the product of spherical particles of the polymeric gel, and further washed with water. The thus washed particles were subjected to sifting to obtain the sifted particles of a diameter in a range of 53 to 250 micrometers, which were highly cross-linked not to be dissolved in various organic solvents at all. After substituting water in the particles with methanol, the particles were filled as a substrate into a glass column of 10 mm in diameter.

Column liquid chromatography by using the thus prepared substrate

After filling the column with the thus prepared particles of the substrate for liquid chromatography, methanol was substituted by pouring an eluent consisting of 80% by weight of acetonitrile, 10% by weight of dichloromethane and 10% by weight of tetrahydrofuran into the column of which packed height is 205 mm.

A liquid mixture of methyl linolate and methyl stearate at a weight ratio of 3:1 amounting to 0.2 ml was poured into the thus prepared column as a specimen to be separated to carry out chromatographic development at a velocity of eluent of 1.1 ml/min. The eluate was subjected to a highly sensitive diffraction refractometer (SHODEX®, Model RI-SE-12, made by SHOWA DENKO Co., Ltd., Japan) to detect the substance therein. The thus obtained chart of refractive index is shown in FIG. 1. As is seen in FIG. 1, methyl linolate and methyl stearate were completely separated from each other to show that the substrate prepared above is extremely effective in separating esters of fatty acids of a long carbon chain to each other.

COMPARATIVE EXAMPLE 1

Preparation of a substrate according to a conventional process

Another spherical particles of polymeric gel were prepared by the same procedures under the same conditions as in Example 1 except for using vinyl acetate instead of vinyl stearate in Example 1, to obtain a substrate for liquid chromatography.

Column liquid chromatography by using the substrate

After subjecting the thus prepared substrate to the same after-treatment as in Example 1, the substrate was filled into a glass column of 10 mm in diameter at a packed height of 200 mm. The same mixture of methyl linolate and methyl stearate as in Example 1 was subjected to chromatography while using the same eluent at the same velocity of elution as in Example 1 and then at a slower velocity of 0.82 ml/min.

As the results, the both components were hardly be separated even at the slower velocity of eluent of 0.82 ml/min.

These results in Example 1 and Comparative Example 1 show that the substrate according to the present invention is highly effective for the isolation and purification of methyl stearate or methyl linolate by the liquid chromatography.

EXAMPLE 2

Preparation of a substrate according to the present invention

A monomer of 30 g of vinyl stearate, a comonomer of 30 g of vinyl acetate, 12 g of triallyl isocyanurate as a cross-linking agent and 40 g of ethyl acetate as an organic solvent was subjected to polymerization under the same conditions as in Example 1 to obtain hard spherical particles of polymeric gel which were then sifted to be the carrier of 53 to 305 micrometers in diameter after the same after-treatment in Example 1.

Column liquid chromatography by using the thus prepared substrate

After substituting water in the thus prepared substrate with methanol, the substrate was filled into a glass column of 10 mm in diameter at a packed height of 230 mm, and after pouring an eluent consisting of 60% by weight of acetonitrile and 40% by weight of water well into the column, 0.3 ml of a 2% by weight solution of a 1:1 by weight mixture of benzene and p-xylene, i.e., the specimen, dissolved in a solvent mixture of the same composition as the eluent was poured into the thus prepared column. Development of the column was carried out by pouring the eluent at a velocity of 1.78 ml/min, the eluate being subjected to the same refractometer as in Example 1 to obtain a chart of elution curve.

On the elution curve of the thus obtained chart, the peaks of eluted benzene and p-xylene appeared after 18 and 30 min, respectively, from the commencement of the developing.

On pouring 0.3 ml of a 1% by weight solution of 2-methyl-naphthalene in the eluent into the same column and developing at the same velocity of eluent, the peak of eluting curve appeared after 47 min from the commencement of the developing.

The results of Example 2 exhibit that the substrate prepared in Example 2 shows an elution nearly corresponding to the hydrophobic property (namely, lipotropism) thereof.

EXAMPLE 3

Preparation of a substrate according to the present invention

Following the same procedures in Example 1, a monomer of 30 g of vinyl stearate, a comonomer of 30 g of vinyl acetate, 12 g of triallyl isocyanurate, 20 g of n-octane and 40 g of ethyl acetate was polymerized to obtain a hard substrate consisting of spherical polymer particles. After subjecting the product to the same after-treatment as in Example 1, the thus obtained substrate was filled into a glass column of 25 mm in diameter at a packed height of 135 mm.

Column liquid chromatography by using the thus prepared substrate

Column chromatography was carried out according to the procedures in Example 1 under the following conditions:

Specimen to be separated:
1% by weight solution of a 1:1 by weight mixture of benzene and 2-methylnaphthalene in a 60:40 by volume mixture of acetonitrile and water (the same as the eluent) in an amount of 0.6 ml.
Eluent: $CH_3CN/H_2O=60/40$.
Velocity of the eluent: 4.4 ml/min.

Figure 2:
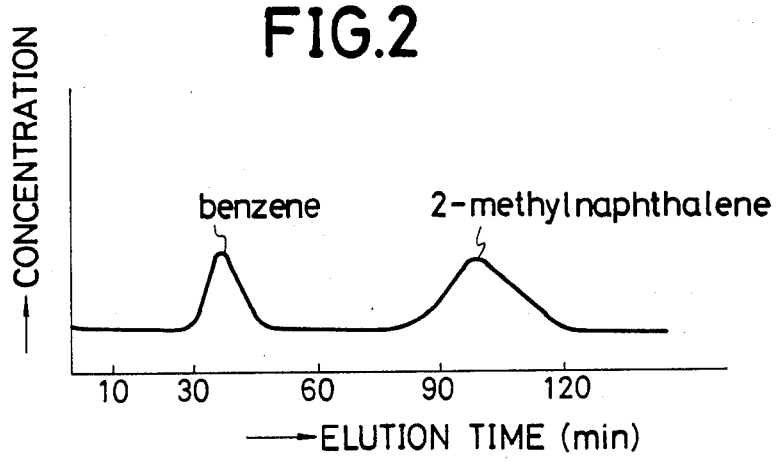

The elution curve is shown in FIG. 2. As is seen in FIG. 2, the substrate prepared in Example 3 is extremely effective in isolating and purifying aromatic substances.

EXAMPLE 4

Following the polymerization in Example 1, a monomer of 60 g of stearyl methacrylate, 12 g of ethylene glycol dimethacrylate, 20 g of n-octane and 40 g of ethyl acetate was subjected to polymerization. The product was sifted to be a substrate consisting of hard spherical particles of 53 to 350 micrometers in diameter.

After substituting water in the substrate with methanol, the substrate was filled into a glass column of 10 mm in diameter at a packed height of 207 mm. A mixture of methyl linolate and methyl stearate was subjected to separation while using the column and a 80:10:10 by volume mixture of acetonitrile, dichloromethane and tetrahydrofuran as the eluent at a velocity of 1.0 ml/min.

As the results, the peaks of eluted methyl linolate and methyl stearate appeared on the elution curve after 19 and 38 min, respectively, from the commencement of the development. The two components could be separated from each other fairly well. The results show that the substrate prepared in Example 4 according to the present invention is effective in separating a mixture of esters of long chain fatty acids to the respective components.

EXAMPLE 5

Following the polymerization in Example 1, a monomer of 60 g of 2-ethylhexyl acrylate, 12 g of ethylene glycol dimethacrylate and 60 g of ethyl acetate was subjected to polymerization in an aqueous suspension to obtain a substrate for the liquid chromatography, consisting of very hard spherical polymer particles.

Of the particles, those of a diameter in a range of 53 to 250 micrometers were filled into a glass column of 10 mm in diameter at a packed height of 200 mm. While using an eluent consisting of 60% by weight of acetonitrile and 40% by weight of water at a velocity of 1.4 ml/min, separation of a 1:1 by weight mixture of benzene and acenaphthylene (as 0.3 ml of 1% by weight solution in the eluent) was carried out. The thus obtained elution curve is shown in FIG. 3.

Figure 3:
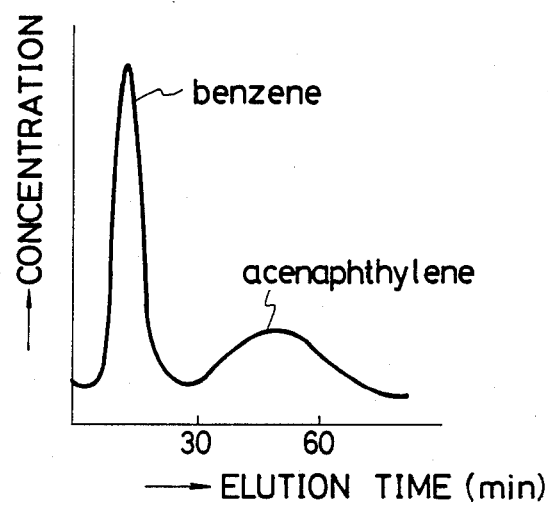

As is seen in FIG. 3, the substrate prepared in Example 5 is effective in separation of a mixture of fat-soluble aromatic compounds to each other.

EXAMPLE 6

In a similar manner to that in Example 1, a monomer of 30 g of stearyl methacrylate, a comonomer of 30 g of methyl methacrylate, 12 g of ethylene glycol dimethacrylate, 40 g of ethyl acetate and 20 g of n-octane was subjected to polymerization in an aqueous suspension system to obtain spherical polymer particles of a diameter ranging from 53 to 350 micrometers.

After filling the particles as a substrate into a glass column of 10 mm in diameter at a packed height of 219 mm, while using an eluent consisting of a 60:40 by weight mixture of acetonitrile and water at a velocity of 1.8 ml/min, a 1:1 by weight mixture of benzene and 2-methylnaphthalene dissolved at 1% by weight in the eluent in an amount of 0.3 ml was subjected to the liquid chromatography.

As the results, in the elution curve, the peaks of benzene and 2-methylnaphthalene appeared respectively after 18.5 and 48 mins from the commencement of developing, which illustrating nearly the complete separation of the components from each other.

EXAMPLE 7

In a similar manner for polymerization to that in Example 1, a monomer of 60 g of n-dodecyl methacrylate, 24 g of ethylene glycol dimethacrylate, and 30 g of ethyl acetate was polymerized in an aqueous suspension system to obtain a substrate consisting of hard spherical polymer particles. Of the thus obtained particles, those of 53 to 250 micrometers in diameter were filled into a column of 10 mm in diameter at a packed height of 193 mm, and separation of a 1:1 by weight mixture of nitrobenzene and 2-methylnaphthalene dissolved in an eluent consisting of a 60:25:15 by volume mixture of methanol, tetrahydrofuran and water in an amount of 0.3 ml was carried out at a velocity of the eluent of 1.7 ml/min. The thus obtained elution curve is shown in FIG. 4.

Figure 4:
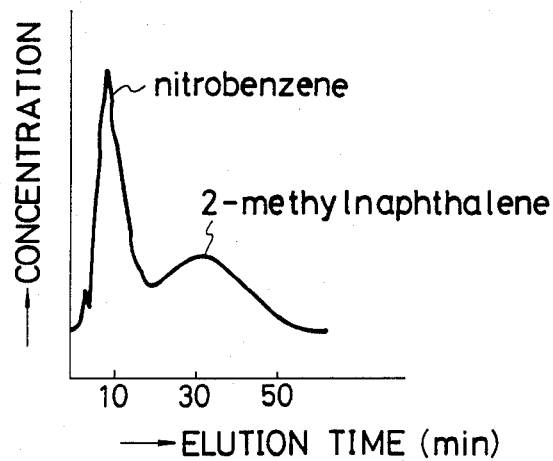

As is seen in FIG. 4, the velocity of elution in the column filled with the substrate prepared in Example 7 was fairly large, and nevertheless, the substrate was sufficiently provided with a function of substrate for the liquid chromatography.

EXAMPLE 8

Figure 5:
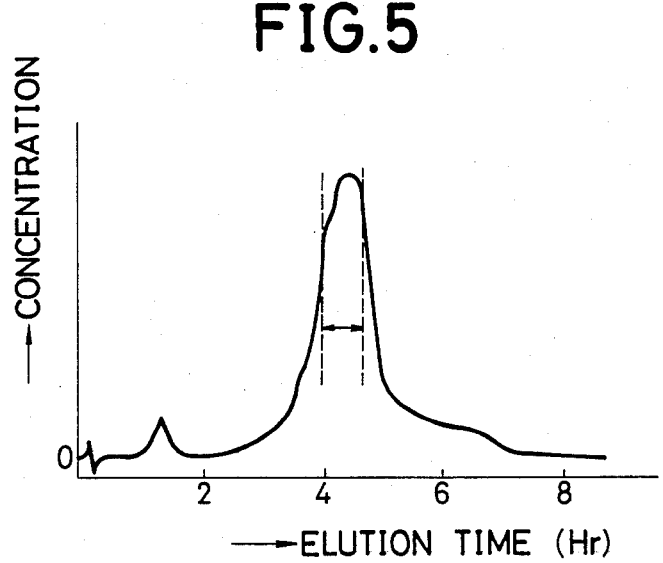

In the same procedures as in Example 1 while using a monomer of 30 g of vinyl stearate, a comonomer of 30 g of vinyl acetate, 12 g of triallyl isocyanurate as a cross-linking agent and 20 g of n-octane and 40 g of ethyl acetate as organic solvents, and carrying out the same after-treatment as in Example 1, spherical particles of cross-linking polymer of 53 to 250 micrometers in diameter were obtained. Five hundred ml of the thus prepared particles were put into 1000 ml of methanol while stirring, and the mixture was poured into a cylindrical column for chromatography of 4 cm in diameter and 30 cm in height to fill up the column. After substituting the solvent in the column with 1.5 liters of an eluent consisting of a 60:25:15 by volume mixture of methanol, tetrahydrofuran and water, 5 g of methyl ester of EPA (purity of 81.5%) obtained by esterification of sardine oil according to an ordinary esterification process followed by urea-purification and fractional distillation and dissolved in 500 ml of the eluent was poured into the column to be partitionally adsorbed, and then developed by pouring the eluent into the column at a velocity of 20 ml/min. The eluate was subjected to the high sensitive differential refractometer used in Example 1 to obtain a recorded chart shown in FIG. 5. In addition, the eluate from he column was analyzed every 200 ml by a gas chromatograph to examine the purity of methyl eicosapentaenoate, and the fractions showning a purity of methyl eicosapentaenoate higher than 98% (those shown by a dotted line in FIG. 5) were collected to be 800 ml. The thus collected fractions were subjected to vacuum distillation to remove the solvent and the residue was dried at 20° to 40° C. under vacuum to obtain 2.5 g of a colourless liquid of a purity of 98.4% of methyl eicosapentaenoate in a yield of 60.4%. The conditions of the above-mentioned gas chromatography were as follows:

Column: 2 m in length and 3 mm in inner diameter made of glass filled with DEGS 10% of 60 to 80 mesh with Uniport HP (made by Gaschro Industry Co., Ltd., Japan) at 200° C. with a carrier gas of helium provided with an FID detector.

EXAMPLE 9

Figure 6:
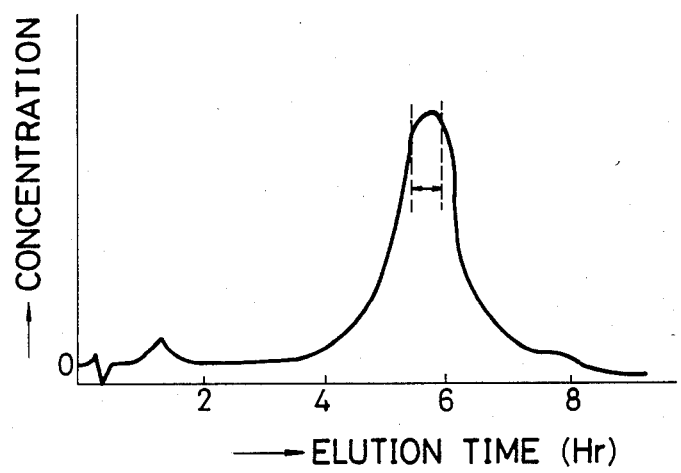

Four grams of impure (purity of 77%) methyl docosahexaenoate obtained by the same process as in Example 8 from cod-oil was dissolved in 500 ml of a 60:25:15 by volume mixture of methanol, dioxane and water, and the thus prepared solution was subjected to liquid column chromatography while using the same substrate prepared in Example 8 and an eluent shown in Example 8 at a velocity of 20 ml/min. By treating the eluate as in Example 8, a result shown in FIG. 6 was obtained. The fractions showing a purity of 98% (those illustrated by a dotted line in FIG. 6) were collected. By treating the collected fractions of 600 ml with the procedures shown in Example 8, 1.4 g of colourless liquid of a purity of 98.1% as methyl docosahexaenoate was obtained in a yield of 44.5%.

EXAMPLE 10

Figure 7:
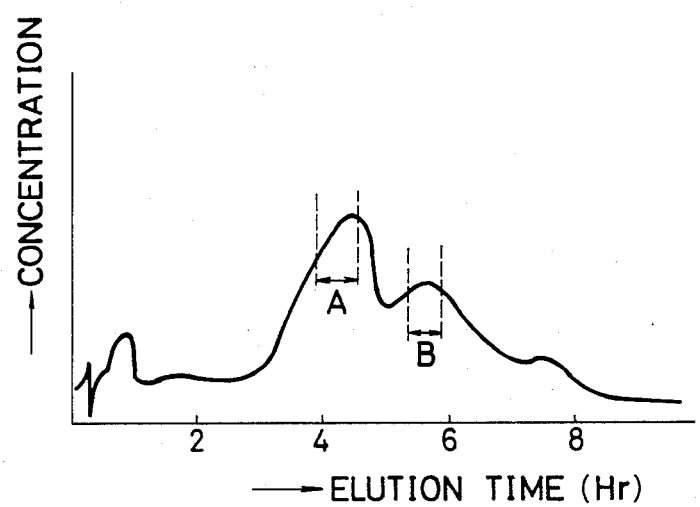

Five grams of a mixture of methyl esters containing 40% by weight of methyl eicosapentoaenoate and 20% by weight of methyl docosahexaenoate obtained by esterification of sardine oil in an ordinary process followed by fractionation with urea were dissolved in 500 ml of a 65:15:20 by volume mixture of methanol, ethyl ether and water, and the solution was subjected to purification by partition chromatography while using the same substrate in the same column as in Example 8 and using an eluent shown also in Example 8 at a velocity of 20 ml/min. The eluate was analyzed every 200 ml by gas chromatography. The results obtained are shown in FIG. 7. Those parts A and B shown by the dotted curves in FIG. 7 were respectively treated by the same procedure as in Example 8. By these treatments, 1.4 g of colourless transparent liquid was obtained from A, and 0.6 g of colourless transparent liquid was also obtained from B. According to the gas chromatographic analyses, A corresponded to methyl eicosapentaenoate of purity of 89.3% in a yield of 59%, and B corresponded to methyl docosahexaenoate of a purity of 80% in a yield of 48% by calculation.

EXAMPLE 11

Three grams of methyl eicosapentaenoate of a purity of 81.5% obtained by esterification of sardine oil in an ordinary process followed by urea-fractionation and fractional distillation were dissolved in 300 ml of a 60:25:15 by volume mixture of methanol, tetrahydrofuran and water. The thus prepared solution was subjected to separation and purification by pouring into a chromatographic column of 4 cm in diameter and 30 cm in height filled with 500 ml of the substrate prepared by the process shown in Example 7. The column was developed by an eluent which has the same composition as the solvent of the methyl eicosapentaenoate to be treated. The state of elution was shown in FIG. 8.

Figure 8:
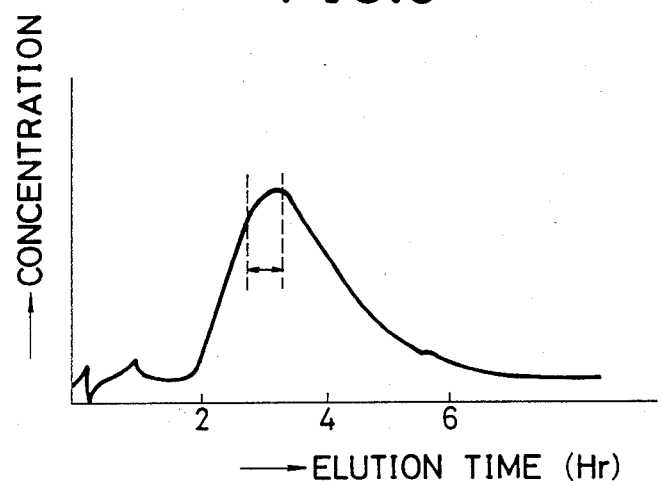

In the same manner as in Example 8, the eluate corresponding to the dotted line in FIG. 8 amounting to 600 ml was subjected to vacuum distillation, and the residue was dried under vacuum to obtain 1.1 g of a colourless and transparent liquid which was found to contain 95.2% by weight of methyl eicosapentaenoate corresponding to a yield of 42.8%.

What is claimed is:

1. A process for isolating and purifying a fat-soluble substance comprising subjecting the fat-soluble substance to liquid chromatography by using as a substrate spherical particles of a highly cross-linked polymer which comprises:
    (a) 100 parts by weight of at least one monomer unit selected from the group consisting of vinyl octanoate, vinyl laurate, vinyl stearate, 2-ethylhexyl acrylate, 2-ethylhexyl methacrylate, dodecyl acrylate, dodecyl methacrylate, stearyl acrylate and stearyl methacrylate, and
    (b) 10 to 100 parts by weight of a cross-linking agent unit which is copolymerizable with any of said monomer and has at least two functional groups.

2. The process according to claim 1, wherein the diameter of said spherical particles is in the range of 3 to 500 microns.

3. The process according to claim 1, wherein said monomer is vinyl stearate or stearyl methacrylate.

4. The process according to claim 1, wherein said cross-linking agent is trifunctional and has the formula (I) or (II):

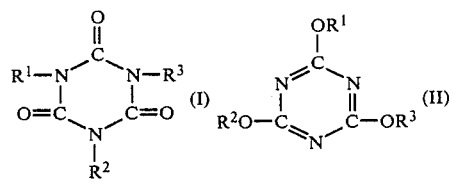

wherein $R^1$, $R^2$ and $R^3$ are the same or different from each other and are selected from the group consisting of allyl, 2-propynyl and 2-methyl-2-propenyl groups.

5. The process according to claim 1, wherein said fat-soluble substance is a lower-alkyl eicosapentaenoate or dodecosahexaenoate.

6. The process according to claim 1, wherein said fat-soluble substance is selected from the group consisting of a glyceride having a saturated or unsaturated alkyl group or groups; a fat-soluble vitamin selected from the group of vitamins A, D and E; a steroid and a derivative thereof; and an aromatic-, polycyclic aromatic- or heterocyclic aromatic compound and a derivative thereof.

* * * * *